United States Patent [19]
Signoret et al.

[11] Patent Number: 5,322,371
[45] Date of Patent: Jun. 21, 1994

[54] FLUID FILM BEARING

[75] Inventors: Jacques Signoret; Pascal Hermel, both of Toulouse; André Jambou, Castelginest, all of France

[73] Assignee: ABG Semca SA, Toulouse, France

[21] Appl. No.: 764,952

[22] Filed: Aug. 24, 1991

Related U.S. Application Data

[63] Continuation of Ser. No. 456,671, Dec. 26, 1989, abandoned.

[30] Foreign Application Priority Data

Dec. 23, 1988 [FR] France .................. 88 17080

[51] Int. Cl.$^5$ ............................................. F16C 17/03
[52] U.S. Cl. ......................................... 384/106
[58] Field of Search ............... 384/106, 103, 104, 105

[56]  References Cited
U.S. PATENT DOCUMENTS 4,462,700  7/1984  Agrawal ............................... 384/106
4,549,821  10/1985  Kawakami ............................ 384/106
4,818,123  4/1989  Gu ........................................ 384/106

Primary Examiner—Lenard A. Footland
Attorney, Agent, or Firm—Harold H. Dutton, Jr.

[57] ABSTRACT

The invention relates to a fluid film bearing, and more particularly the improvement of the load capacity and stability of such a bearing.

The fluid film bearing comprises a housing 7 and several bearing sub-assemblies each comprising a flexible leaf 2, a leaf reinforcing element and a support bar (5), the sub-assemblies of the bearing being fixed to the housing by insertion of each bar 5 into a groove provided in the housing. The reinforcing element comprises an upper stiffener 3 secured to the bar of a sub-assembly, and a lower stiffener 4 secued to the bar of an adjacent sub-assembly, the two stiffeners 3 and 4 overlapping on at least one part of one of their faces. The bearing is advantageously provided with a preloading spring 6.

The bearing is particularly useful in turbo engines, especially whey they form part of aircraft, more particularly military aircraft.

5 Claims, 4 Drawing Sheets

FLUID FILM BEARING

This is a continuation of Ser. No. 07/456,671, filed Dec. 26, 1989, abandoned.

The present invention relates to a fluid film bearing, and more particularly an improvement in the load capacity and the stability of such a bearing.

Fluid film bearings are more and more utilized in applications in machines rotating at high speed where a lubrication by oil is not considered because of technical conditions of the environment or economics. The principle of these bearings consists of creating a wedge of air under pressure between a rotating body and a fixed surface.

These bearings are intended to support a rotating shaft. They are generally constituted by an internal bore on the circumference of which is arranged an assembly of leaves or sheets. These leaves carry on their side facing the rotating shaft a self-lubricating coating to assure the start-up of the shaft with a minimum of wear. A stiffening member is placed between the sheets and the internal bore. This stiffener controls the eccentricity of the shaft under the effect of the load and also controls the dampening by friction between sheet and stiffener necessary to increase the upper limit of speed to the point at which the bearing may function.

The problems connected with the operation of such a bearing are different depending upon whether it is in the start-up phase or the phase of operating under load.

Upon start-up, the sheets must be very flexible with a weak pre-loading for minimizing the frictional forces between the shaft and the sheet.

When operating under load, the supporting of the load of the sheet requires a more significant stiffening than in the start-up phase. This greater stiffening is obtained by a stiffener, the action of which comes into play after the start-up phase for inclining the sheet into the position adequate for the load which is applied to it.

When operating under load, it is also necessary to dampen the fluid bearing in order to avoid or reduce the effect of resonances at nominal operating speed. In the case of air, which is only a slightly viscous fluid, the dampening is carried out primarily by dissipation of energy by dry friction, termed Coulomb friction.

Different attempts have been made for resolving these problems, and the devices have been described for this purpose particularly in U.S. Pat. No. 1,684,693 (Bohn) and French Patents 1,517,739 and 2,352,985.

The present inventors have therefore sought to provide additional improvements in fluid film bearings and have conceived a fluid film bearing constituted by a housing 7 and several bearing sub-assemblies each comprising a flexible leaf 2, a leaf reinforcing element 2 and a small support bar 5, the bearing sub-assemblies being secured to the housing by insertion of each support bar 5 into a groove provided in the housing, characterized in that the reinforcing element is comprised of two stiffening members, an upper stiffener 3 sliding against the support bar of one sub-assembly, and a lower stiffener 4 sliding against the support bar of an adjacent sub-assembly, the two stiffeners 3 and 4 overlapping on at least a portion of their faces.

Upon start-up, the bearing must have a pronounced wedge for initiating the fluid film. To this effect, in each sub-assembly of the bearing, a preloading spring will preferably be placed between the support bar and the housing.

Another solution comprises preforming the flexible leaves, the lower stiffeners or the upper stiffeners. In this case, the preformed element plays an analogous role to that of the preload spring.

The stiffness upon start-up obtained by one of these techniques is slight with respect to the stiffness during operation.

Preferably, in each sub-assembly of the bearing, the upper stiffener 3 has projecting parts on its upper face, the lower stiffener 4 has projecting parts on its lower face, the projecting parts of one of the stiffeners being alternated with the projecting parts of the other stiffener, said projecting parts comprising supports.

In such an apparatus, a rubbing of the smooth part of each opposing upper and lower stiffener is produced upon vertical movements caused by the supports under the effects of fluctuations in the load. For this, the stiffeners are held at one of their extremities without the possibility of moving in the direction of movement of the sub-assembly. One of the stiffeners is held against the leading support bar, the other against the trailing support bar. The fluctuations produced during deformation under load cause a relative sliding in an opposite direction of the two stiffeners, due to friction and absorption of energy.

The smooth parts opposite each stiffener may be coated with a coating selected for adjusting the effect of the dampening.

During operation under load, the assembly of leaves and stiffeners comes to rest while catching up with the deformation induced by the effect of the starting spring or the element which it takes the place of. The elasticity is obtained by the vertical depth of the supports on the stiffeners. The upper and lower supports are arranged in such a manner that, under load, the inclination of the bearing remains near the optimum inclination. In effect, if the inclination deviates too far from ideal, the load capacity may become nil.

The variation of the inclination as a function of the load is obtained by the recessing of the assembly, the leading, the center and the trailing portions of the bearing not penetrating the same depth as a function of the load.

In a preferred embodiment, the shortenings may be provided in the upper stiffeners 3, or simultaneously in the lower and upper stiffeners, in such a manner as to locally weaken these elements in order to obtain the optimum desired deformation.

In another variation of the invention, each flexible leaf 2 has a dimension such that its free extremity overlays the fixed extremity of the adjacent leaf. A supplemental dampening is thus obtained by the friction of these flexible leaves one against the others.

Further, the flexible leaf 2 of a bearing sub-assembly may be pierced immediately down from the preceding sub-assembly, in such a manner as to correctly feed the active part of the following leaf with gas.

Preferably these leaves may have a coating of a material comprising a self-lubricating constituent, for example of polytetrafluoroethylene (PTFE).

A bearing according to the invention comprises preferably from 2 to 9 sub-assemblies of bearings as above described.

The present invention will be explained in greater detail, in a non-limiting manner, with reference to the attached drawings.

In these drawings, FIGS. 1 to 3 each represent a transverse cross-sectional view of three variations of bearings according to the invention;

Figure 1:
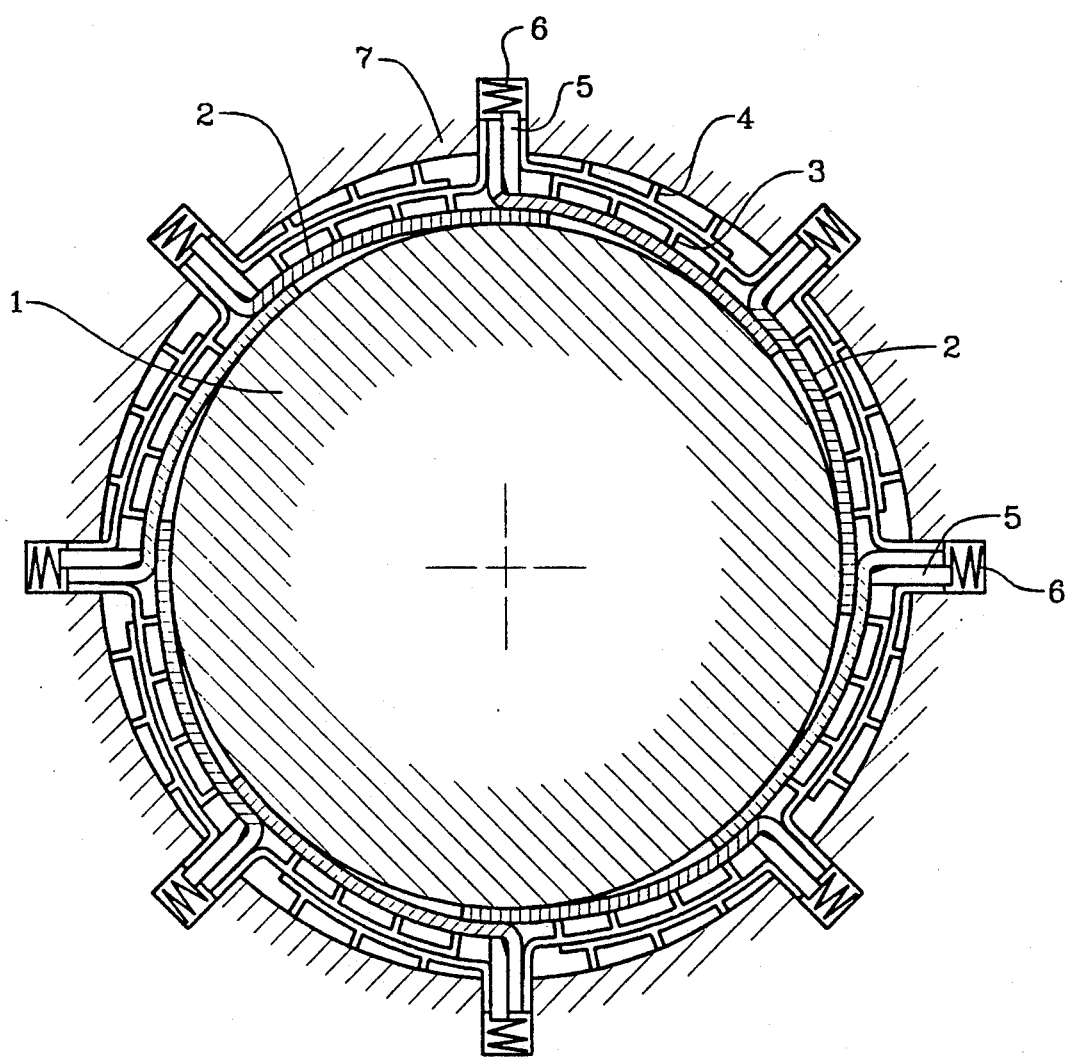

The bearing which is shown in FIG. 1, intended to support the shaft 1, comprises a housing 7 in which are inserted support bars 5. Springs 6 are placed between the bars 5 and the housing 7.

On each bar 5 is secured a lower stiffener 4, an upper stiffener 3 and a flexible leaf 2. The two stiffeners of the same sub-assembly of the bearing slide radially against the adjacent bars. The flexible sheets 2 partially overlap each other.

The stiffeners 3 and 4 are each comprised of a metal sheet folded so as to form a mounting part. The face of each stiffener carrying the projecting parts is grooved to form alternating ribs and grooves and which are arranged longitudinally with respect to the shaft.

Figure 4:
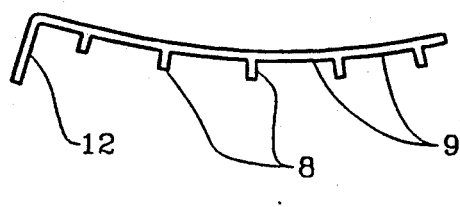
FIGS. 4 and 5 are cross-sectional views of two types of stiffeners.

Such a stiffener is shown in FIG. 4 in which 12 designates the mounting part, 8 designates the ribs and 9 the grooves of the face carrying the projecting parts.

At rest, the leaf 2 is urged against the shaft 1 by the bar 5, itself pushed by the pre-load spring 6. The leaf 2 is not urged against the upper stiffener and works on its own stiffener. In such a manner as to optimize upon start-up the product PV (pressure times velocity) between the shaft and the self-lubricating coating of the leaf 2, the preload is adapted independently of all the other functions of the bearing by selecting stiffness and the force of the spring 6. This stiffness is much lower than that of the two stiffeners 3 and 4. In practice, the influence of the spring 6 is only felt upon start-up.

In stable operation, a range of pressure generated by the rotation of the shaft 1 is established between the shaft 1 and the leaf 2. This range urges the leaf 2 against the stiffeners 3 and 4 which move radially according to the intensity of the load.

During operation under unstable tendencies, the range of pressure fluctuates, causing a radial displacement of the leaf 2. This radial displacement causes a relative circumferential displacement between two leaves, which induces a first dampening by friction one against the other of the overlapping parts of these leaves which are then established on a different diameter.

A second dampening by greater friction is given by the relative circumferential displacement of the leaf 2 and the stiffener 3.

A third dampening by friction is given by the relative circumferential displacement of the upper stiffener 3 and the lower stiffener 4.

Further, the presence of a pre-load spring permits by the addition of a single element the stiffening advantages arising from friction at the overlapping of the different elements and the advantages of load and stiffening which are improved by the two stiffeners.

Figure 2:
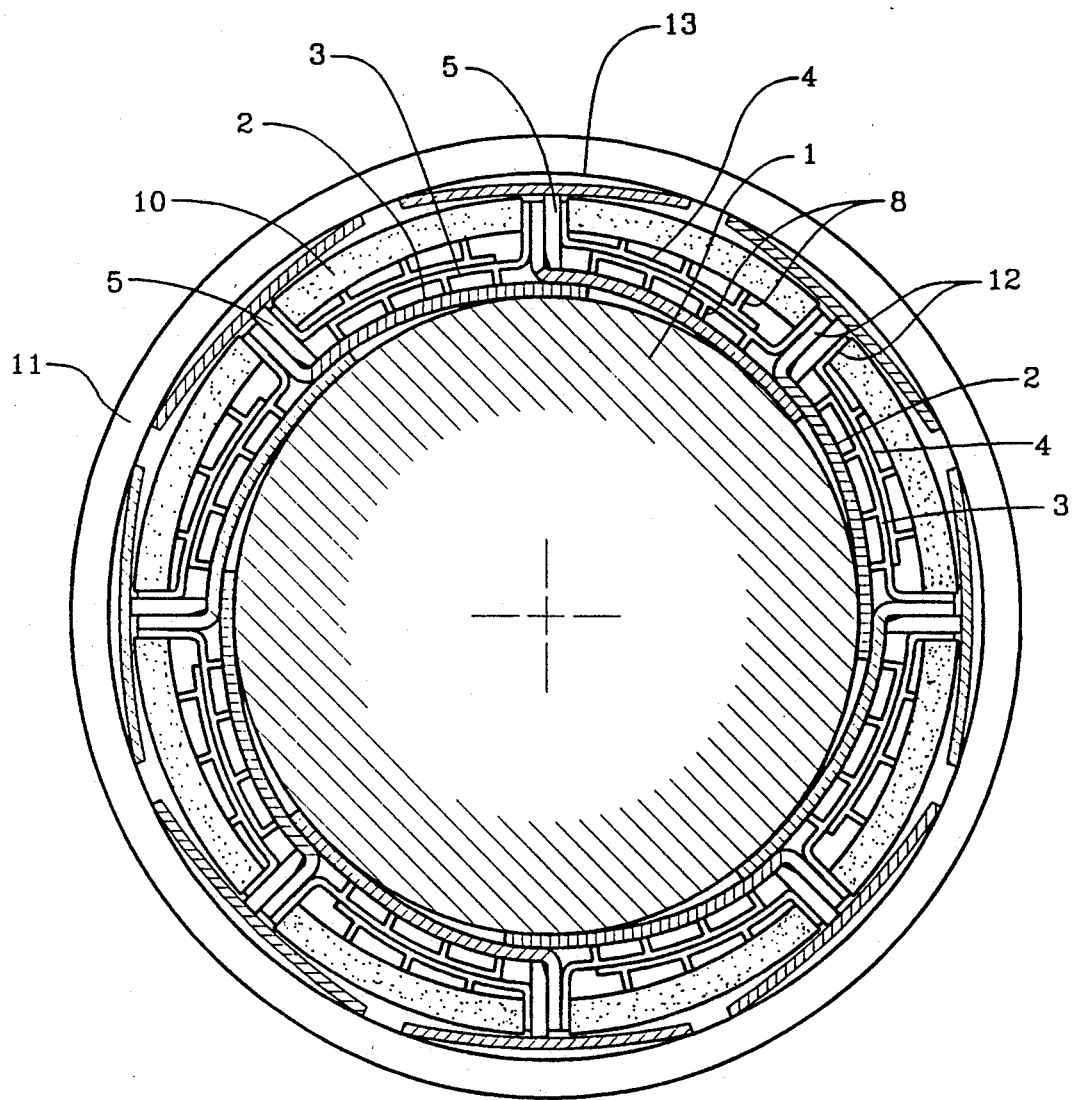

In FIG. 2 is shown an analogous bearing to that of FIG. 1 with the exception of the pre-load spring. In this figure, the equivalent elements to those of the bearing of FIG. 1 are designated by the same reference numerals. The housing is comprised of two parts: an inner housing 10 traversed by the bars 5 and an outer housing 11. A leaf spring 13 is situated at the extremity of the bar 5 opposite the shaft, between the inner housing 10 and the outer housing 11. The bearing of this FIG. 2 functions in an analogous manner to that of the bearing of FIG. 1, both upon start-up and during stable operation or under unstable tendencies.

Figure 3:
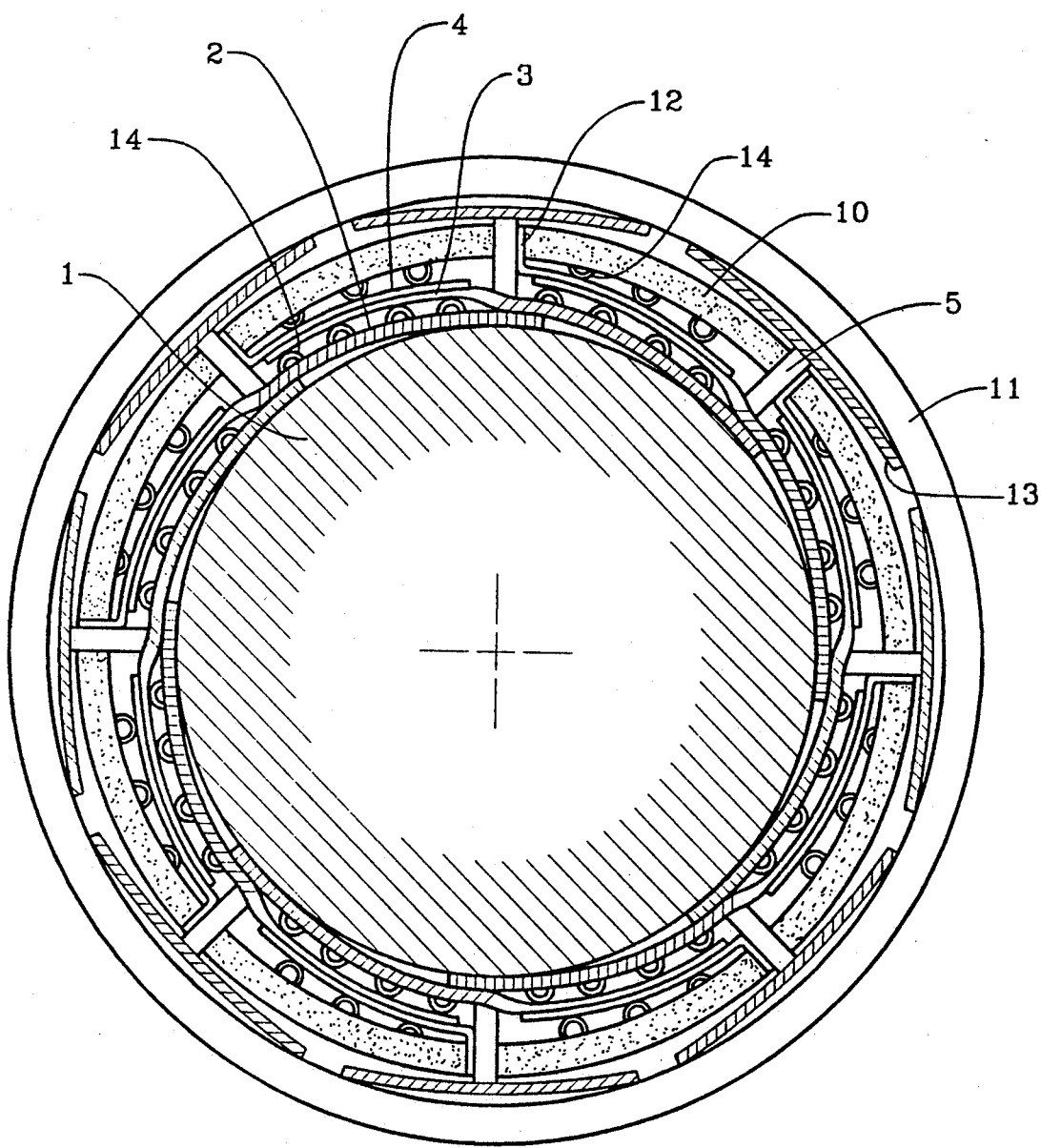
Figure 5:
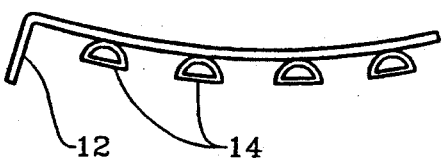

FIG. 3 shows a bearing provided with a leaf spring 13 identical to that of FIG. 2. The external stiffener 4 is of the type shown in FIG. 5. It comprises a metal leaf having a curvature and folded to form a mounting part 12. The supports 14 comprise hollow rings with a semi-circular cross-section, soldered at points to the metal sheet. The flexible leaf 2 of a sub-assembly of the bearing is an extension of the upper stiffener 3 of the adjacent sub-assembly, forming a single sheet. The zone by which this single sheet is fixed to the bar 5 constitutes the limit between the flexible leaf and the upper stiffener. The stiffening parts of the upper stiffener are identical to those of the lower stiffener 4 and are arranged alternately with those of the stiffener 4. In this variation, the flexible leaves 2 and the stiffeners are comprised in the same manner as in the embodiments of FIGS. 1 or 2.

Figure 6:
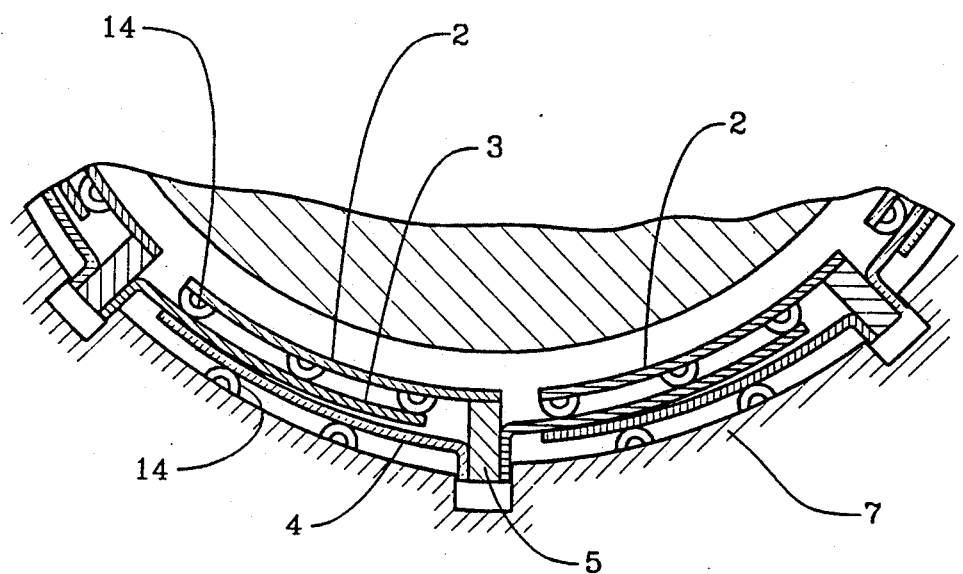
FIG. 6 is a partial transverse cross-sectional view of a fourth variation.

FIG. 6 shows in cross-sectional view a part of a bearing according to the invention in another variation. The lower stiffener 3 is of the type shown in FIG. 5. The upper stiffener 4 is of an analogous type. The curvatures of the two stiffeners are different, thus creating the equivalent of a pre-load spring. After start-up, the load lays the upper stiffener against the lower stiffener. Further, there is no overlapping between two adjacent flexible leaves 2. These two leaves are separate.

Figure 7:
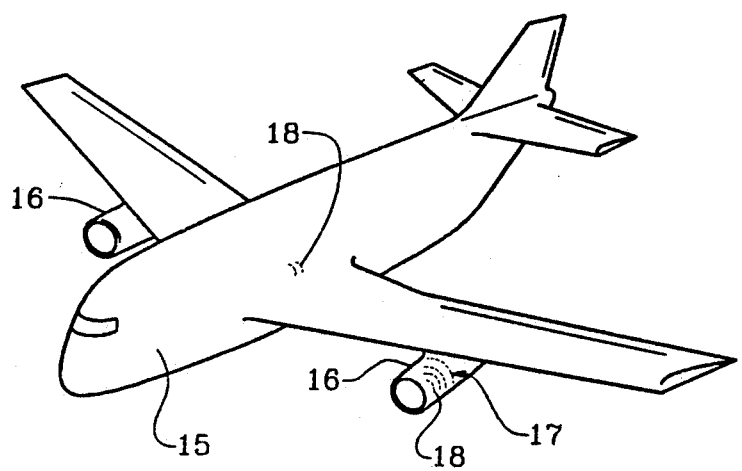

In FIG. 7 is shown an airplane provided with engines 16. These engines comprise turbo motors 17, themselves including bearings according to the invention.

The improvements provided by bearings according to the invention permit improving the behavior of these bearings. This property is particularly significant when the bearings are used in turbo engines, indeed those used in the aeronautical field, and more particularly in military aircraft.

We claim:

1. A fluid film bearing comprising a housing and a plurality of bearing sub-assemblies, each comprising a flexible leaf (2), a leaf reinforcing element and a support bar (5), the sub-assemblies of the bearing being secured to the housing by insertion of each bar (5) into a groove provided in the housing, and wherein said reinforcing element comprises two stiffeners, an upper stiffener (3) sliding against the bar of one sub-assembly, and a lower stiffener (4) sliding against the bar of an adjacent sub-assembly, the two stiffeners overlapping on at least one part of one of their faces.

2. A fluid film bearing as in claim 1, and wherein in each bearing sub-assembly, the upper stiffener 3 has projecting members on its upper face, the lower stiffener 4 has projecting members on its lower face, the projecting members of one of the stiffeners being alternated with the projecting members of the other stiffener.

3. A fluid film bearing as in claim 2, and wherein each stiffener comprises a metal sheet having adequate curvature and of which one of the faces has alternating ribs (8) and grooves (9).

4. A fluid film bearing as in claim 2, and wherein the projecting members comprise rings 14 of a semi-circular cross-section, soldered at points to the leaf comprising each stiffener.

5. A bearing as in claim 1, and wherein one of the elements of each sub-assembly selected from the flexible leaf, the upper stiffener and the lower stiffener is pre-formed in such a manner as to assure the formation of a pronounced wedge of air upon start-up of the bearing.

* * * * *